United States Patent
Van Den Enden

[11] Patent Number: 6,108,154
[45] Date of Patent: Aug. 22, 2000

[54] REPRODUCTION OF AN INFORMATION SIGNAL FROM A RECORD CARRIER

[75] Inventor: Gijsbert J. Van Den Enden, Eindhoven, Netherlands

[73] Assignee: U.S. Philips Corporation, New York, N.Y.

[21] Appl. No.: 09/065,965

[22] Filed: Apr. 24, 1998

[30] Foreign Application Priority Data

Apr. 28, 1997 [EP] European Pat. Off. ............. 97201273

[51] Int. Cl.[7] .............................. G11B 5/09; G11B 5/035
[52] U.S. Cl. ............................................... 360/51; 360/65
[58] Field of Search ................................. 360/51, 32, 65, 360/73.03, 73.04, 73.08, 73.14

[56] References Cited

U.S. PATENT DOCUMENTS

| | | | |
|---|---|---|---|
| 5,786,853 | 7/1998 | Kalfs | 360/51 |
| 5,905,601 | 5/1999 | Tsunoda | 360/51 |
| 5,909,332 | 6/1999 | Spurbeck et al. | 360/51 |
| 5,978,426 | 11/1999 | Glover et al. | 360/51 |

*Primary Examiner*—W. Chris Kim
*Attorney, Agent, or Firm*—Edward W. Goodman

[57] ABSTRACT

An apparatus for reproducing an information signal from a record carrier includes at least one read head (6,8) for reading the information signal from a track on the record carrier (4). Further, an A/D converter (12,34) is available for A/D converting the information signal read from the record carrier with a specific clock frequency ($f_s$) in response to a first control signal (cs1). A bit detector unit (24) is provided having an input coupled to the A/D converter for retrieving a sequence of bits from the signal applied to its input, with a specific bit frequency ($f_b$). A generator unit, for deriving the first control signal, as well as a generator for deriving the specific bit frequency, is available. The generator unit for deriving the first control signal includes a coarse control signal generator (48,60) for deriving a coarse control signal so as to generate such specific clock frequency ($f_s$) that, roughly, N samples per bit are supplied by the A/D converter (12,34), irrespective of the relative velocity of the said at least one read head with reference to the said track, and a fine control signal generator (30,70,72) for deriving a fine control signal (cs3) so as to correct for the deviation of the specific clock frequency, expressed in number of samples per bit, from the value of N samples per bit, where N is a positive constant value.

6 Claims, 3 Drawing Sheets

REPRODUCTION OF AN INFORMATION SIGNAL FROM A RECORD CARRIER

BACKGROUND OF THE INVENTION

1. Field of the Invention

The invention relates to an apparatus for reproducing an information signal from a record carrier signal from a record carrier. Such apparatuses are well known in the art. Reference is made this respect to U.S. Pat. No. 5,569,912.

2. Description of the Related Art

The apparatus defined above may be of the SDAT type or the DCC type, or may be of the helical scanning type. In all apparatuses, the at least one reading head reads the information signal from a track on the record carrier, while the head is moved relative to the track with a specific velocity. The record carrier is aimed at being transported with a nominal velocity during reproduction, so that an information signal with a substantially constant bit rate can be regenerated from the record carrier.

SUMMARY OF THE INVENTION

An object of the invention is to provide a reproducing apparatus which is more versatile and is capable of reading information from the record carrier at various speeds.

In accordance with the invention, the apparatus for reproducing an information signal from a record carrier, comprising reading means (6,8) for reading the information signal from a track on the record carrier (4), the reading means comprising at least one read head (6) for reading the information signal from said track, A/D conversion means (12,34) for A/D converting the information signal read from the record carrier with a specific clock frequency ($f_s$), in response to a first control signal (cs1), bit detector means (24) having an input coupled to the A/D conversion means, which bit detector means is adapted to retrieve a sequence of bits from the signal applied to its input, with a specific bit frequency ($f_b$), output means (28) for supplying the sequence of bits, means for deriving said first control signal, and means (30) for deriving said specific bit frequency, wherein the means for deriving said first control signal comprises means (48,60) for deriving a second control signal (cs2) which is a measure of the relative velocity of the said at least one read head with reference to the said track, and means (30,70,72) for deriving a third control signal (cs3) which has a relationship with the bit frequency, and means (84) for deriving the first control signal from the second and third control signal.

The invention is based on the recognition to provide an apparatus having an A/D converter and further digital elements, such as an equalizer and bit detector means, where the ratio between the specific clock frequency and the bit frequency is a fixed value N. This is realized by two control loops, one coarse control loop and a fine control loop. The coarse control loop generates the second control signal and controls the specific clock frequency in such a way that the A/D converter supplies a substantially fixed number of N samples per bit to be detected, irrespective of the relative velocity of the read head with reference to the track. The fine control loop generates the third control signal and controls said specific clock frequency so as to correct for the deviation of the specific clock frequency, expressed in number of samples per bit, from the value of N samples per bit.

As a result, although the means for deriving said specific bit frequency may have a small capture range, the apparatus will very quickly control towards the N samples per bit situation.

BRIEF DESCRIPTION OF THE DRAWINGS

These and other aspects of the invention will be apparent from and elucidated with respect to the embodiments described hereafter in the drawings, in which.

DESCRIPTION OF THE PREFERRED EMBODIMENTS

Figure 1:
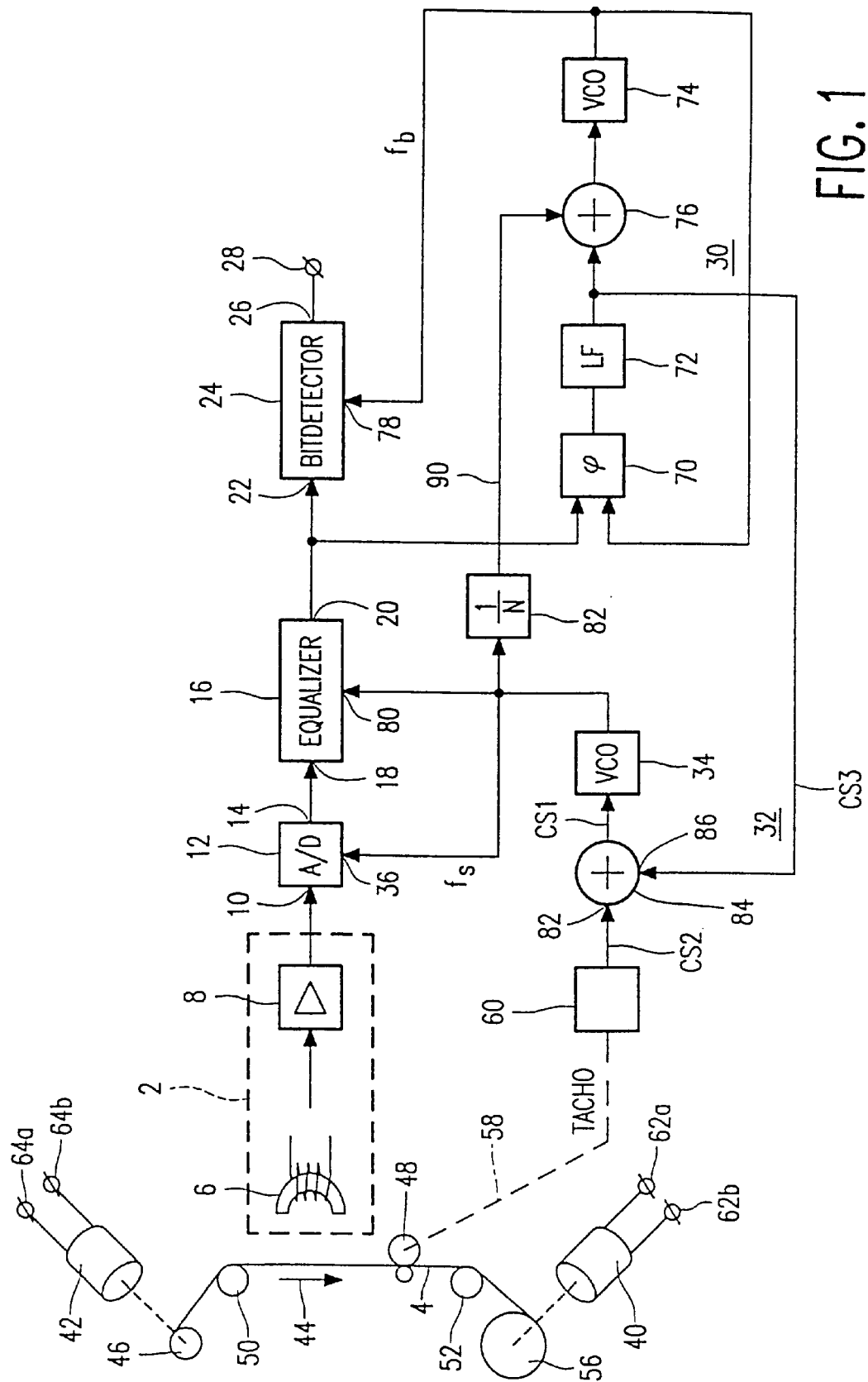
FIG. 1 shows an embodiment of the apparatus.

FIG. 1 shows an embodiment of the reproducing apparatus in accordance with the invention. The apparatus comprises a reading unit 2 for reading the information from a record carrier 4. The reading unit comprises at least one read head 6 and generally also a pre-amplifier 8. An output of the reading unit 2 is coupled to an input 10 of an A/D converter 12, which has an output 14. The A/D converter 12 samples the information read from a track on the record carrier 4 with a specific clock (or sampling) frequency $f_s$ and supplies samples of the information signal with said specific clock frequency at its output 14.

The apparatus is generally provided with an equalizer unit 16. The equalizer unit 16 is however, not strictly necessary for explaining the invention, so could be left out. An input 18 of the equalizer unit 16 is coupled to the output 14 of the A/D converter 12, and an output of the equalizer unit 16 is coupled to an input 22 of a bit detector unit 24. An output 26 of the bit detector unit 24 is coupled to an output terminal 28.

The bit detector unit 24 is adapted to retrieve a sequence of bits from the signal applied to its input 22, with a specific bit frequency $f_b$.

The apparatus further comprises a generator circuit 30 for generating the bit frequency $f_b$, and a generator circuit 32 for generating the clock frequency $f_s$. The generator circuit 32 is a phase-locked loop and comprises a phase comparator 70, a loop filter 72 and a voltage-controlled oscillator 74. A first input of the phase comparator 70 is coupled to the output of the equalizer unit 16 and a second input of the phase comparator 70 is coupled to the output of the oscillator 74. An output of the phase comparator 70 is coupled to an input of the loop filter 72, which has an output coupled, via a signal combination unit 76' to an input of the oscillator 74. The output of the oscillator 74 is further coupled to a clock input of the bit detector 24.

It should be noted that the generator circuits 30 and 32 function such that they generate frequencies $f_b$ and $f_s'$ respectively, such that $f_s/f_b=N$, where N is a constant, not necessarily an integer constant, irrespective of the relative speed of the head 6 with reference to the track on the record carrier which is read out.

The value N stands for the number of samples per bit, to be detected by the bit detector unit 24, and generated by the A/D converter 12.

The A/D converter 12 converts the information signal read from the record carrier with said specific clock frequency $f_s$, in response to a first control signal cs1. In the present embodiment, this clock signal is generated by a voltage-controlled oscillator 34, which is part of the loop 32' and supplies the clock frequency $f_s$ to a clock input 36 of the A/D converter 12. The clock frequency $f_s$ is also supplied to a clock input 80 of the equalizer unit 16 and to a converter 82. The converter 82 is in the form of a frequency divider and divides the frequency $f_s$ supplied to its input by N and supplies a frequency $f_s/N$ to its output. This output is coupled to another input of the signal combination unit 76.

Drive motors 40 and 42 are provided for transporting the record carrier 4 in a direction indicated by the arrow 44 or in a direction reverse thereto. When driven in the direction indicated by the arrow 44, the record carrier is transported from a supply reel 46, via a roller 50, past the read head 6 and a friction roller 48, and via a roller 52 onto a take-up reel 56. The friction roller 48 is provided with a tacho generator which supplies tacho pulses via the line 58 towards a converter 60. Drive signals to drive the drive motors 40 and 42 are supplied via their terminals 62a,62b and 64a,64b, respectively.

The converter 60 generates a second control signal cs2 in response to the tacho pulses generated by the tacho generator coupled to the friction roller 48. The second control signal cs2 is a measure of the relative velocity of the read head 6 with reference to the track from which it reads the information signal. The second control signal cs2 is supplied to an input 82 of a signal combination unit 84. Via a second input 86 of the combination unit 84, a third control signal cs3 is supplied. This third control signal cs3 is the output signal of the loop filter 72 in the PLL 30.

The functioning of the apparatus will now be described in greater detail. It is assumed that the record carrier is driven at a specific speed $v_1$. As a result, tacho pulses are supplied to the converter 60 and the converter 60, and generates a second control signal cs2 in response thereto. The second control signal cs2 is supplied to the oscillator 34 and results in the generation of a clock frequency $f_s$, which is supplied to the A/D converter 12. In response thereto, the A/D converter 12 samples the information signal read from the record carrier such that roughly N samples per bit to be detected are generated. When the record carrier speed changes, either increases or decreases, the frequency of the tacho pulses generated increases or decreases. As a result, the clock frequency $f_s$ increases or decreases. With an increased (decreased) record carrier speed, however, the information signal is read out with an increased (decreased) speed and this information signal is sampled with an increased (decreased) clock frequency $f_s$, so that, in the end, again roughly N samples per bit to be detected are generated by the A/D converter 12, irrespective of the record carrier speed.

The control loop, formed by the elements 48, 60, 34' thus constitutes a coarse control loop, such that at the output of the A/D converter 12, roughly a fixed number (N) of samples per bit to be detected is generated. N could, as an example, be chosen equal to 3.

Figure 4:
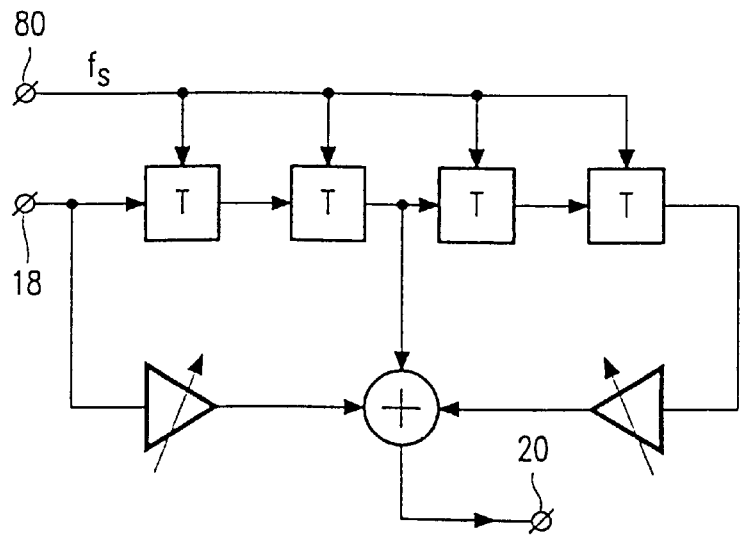
FIG. 4 shows an embodiment of the equalizer unit in the apparatus of FIG. 1.
Figure 5:
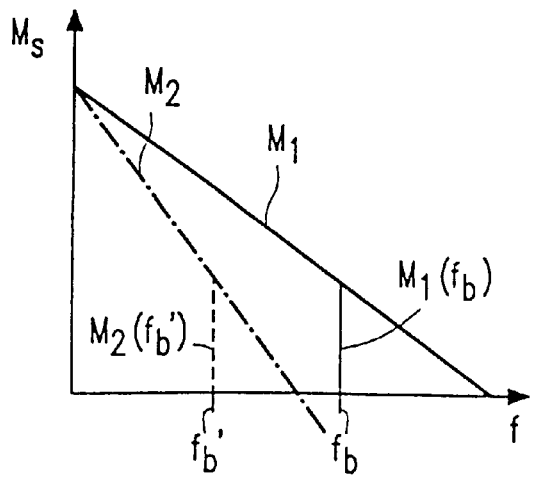
FIG. 5 shows the magnitude characteristic as a function of frequency of the information signal read from the record carrier, for two different speeds of the record carrier during reproduction.
Figure 6:
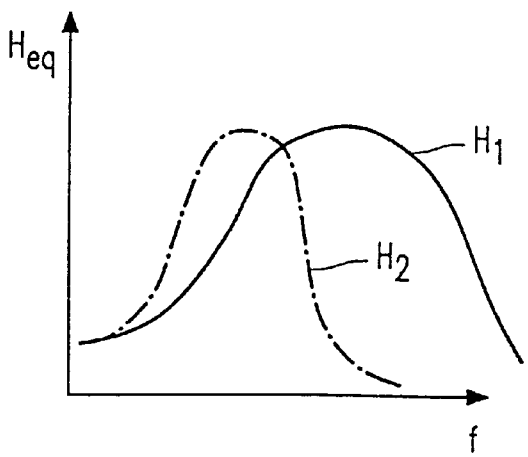
FIG. 6 shows the filter curve of the equalizer unit as a function of frequency, for the same two different speeds of the record carrier.

The equalizer unit 16 also receives the clock frequency $f_s$. FIG. 4 shows an example of an embodiment of the equalizer unit 16; FIG. 5 shows an example of the magnitude characteristic $M_1$ as a function of frequency, of the information signal read from the record carrier at said specific speed $v_1$; and FIG. 6 shows, by the curve $H_1$, the frequency characteristic of the equalizer unit 16 at said specific record carrier speed $v_1$. The magnitude characteristic $M_1$ has a certain magnitude $M_1(f_b)$ at the bit frequency $f_b$.

The delay elements, denoted T in the equalizer unit of FIG. 4, are controlled by the clock frequency $f_s$ and realize a delay T which equals $1/f_s$. With this delay, the equalizer unit 16 of FIG. 4 realizes the frequency characteristic $H_1$ in FIG. 6.

When changing the record carrier speed, such as decreasing the speed by a factor of 2, the magnitude characteristic of the signal read from the record carrier scales down by a factor of 2, so that it changes into the characteristic $M_2$ shown in FIG. 5. The magnitude $M_2(f_b')$ at the new bit frequency $f_b'$, is equal to $M_1(f_b)$. Because of the control loop formed by the elements 48, 60 and 34, the clock frequency $f_s$ is changed (decreased) with the same ratio of 2. As a result, the delays in the equalizer unit of FIG. 4 change, in the sense that their delay increases by this same factor of 2. This results in the frequency characteristic $H_2$ in FIG. 6. This characteristic $H_2$ has thus been scaled down to the same extent as the magnitude characteristic $M_2$ of the information signal read from the record carrier.

The functioning of the equalizer unit 16 is thus such that, again irrespective of the record carrier speed, the equalizer unit 16 correctly equalizes the signal read from the record carrier, under the control of the clock frequency $f_s$ generated by the oscillator 34.

The converter unit 82 generates a control signal at its output which is supplied via the combination unit 76 to the oscillator 74 so as to position the oscillator unit 74 at the frequency $f_s/N$.

Figure 7:
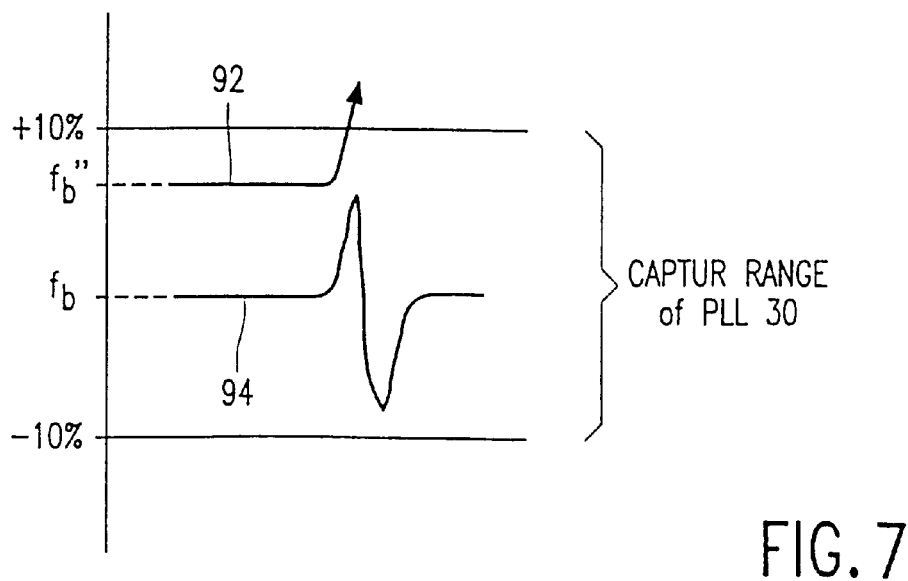
FIG. 7 shows the capture range of the phase locked loop in the apparatus of FIG. 1.

It should be noted that the PLL 30 controls the frequency of the oscillator 74 towards $f_b$. The PLL 30, however, has a small capture range of, e.g., 10% smaller or larger than $f_b$, see FIG. 7. Using the control signal, applied via the line 90 and the signal combination unit 76 to the VCO 74, this VCO 74 is quickly brought into the vicinity of $f_b$, such as indicated by the line 92 in FIG. 7. Without the fine control, using the control signal cs3, to be described later, the VCO 74 will maintain the frequency value $f_b''$ and a disturbance, e.g., caused by a variation in the speed of the record carrier, will bring the frequency out of the capture range of the loop 30, as shown by the curve 92 in FIG. 7, so that the PLL 30 is out of lock.

The phase comparator 70 and loop filter 72, however, generate a control signal, which is the control signal cs3, which is a measure of the deviation of the frequency of the VCO 74 from the required bit frequency $f_b$. It should be noted here that the required bit frequency $f_b$ is not a fixed frequency value, but varies with varying record carrier speed.

This control signal cs3 is supplied to the second input 86 of the signal combination unit 84. This control signal cs3 is a fine control signal and controls the frequency of the VCO 74 towards the required bit frequency $f_b$. This is shown by the line 94 in FIG. 7. A disturbance, e.g., caused by a variation in the speed of the record carrier, will result in a variation in the frequency of the VCO 74. This variation, however, is kept within the capture range of the loop 30, as shown by the curve 94 in FIG. 7, so that the PLL 30 remains in a locked situation.

Figure 2:
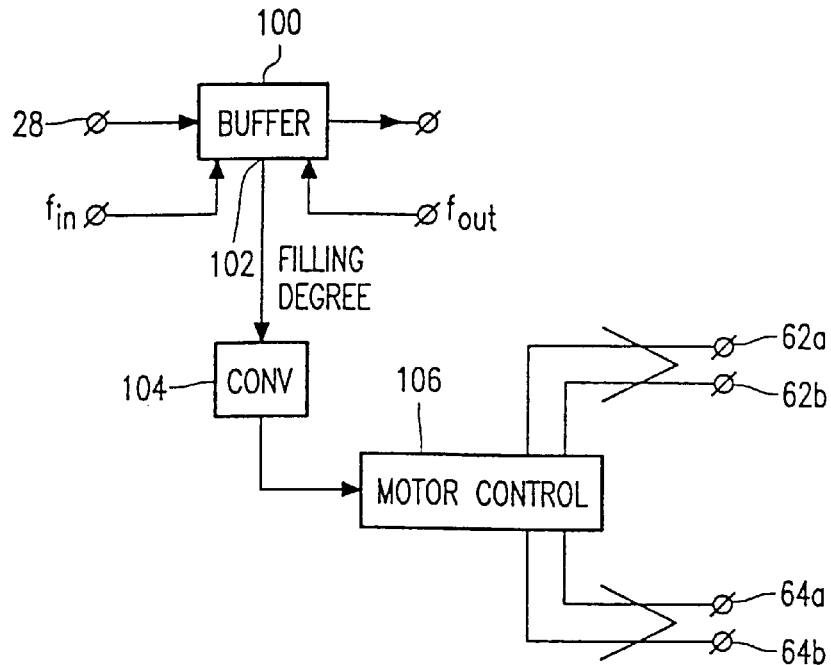
FIG. 2 shows the addition of an output buffer to the apparatus of FIG. 1.

FIG. 2 shows a buffer memory 100 that can be coupled to the output terminal 28 of the apparatus of FIG. 1. The buffer memory 100 functions as a FIFO memory. The sequence of bits detected by the bit detector 24 can be stored in the buffer memory with a specific frequency $f_{in}$ which will equal the frequency $f_b$, generated by the oscillator 74.

The detected bits can be retrieved from the buffer memory 100 using a read-out clock frequency $f_{out}$. This frequency $f_{out}$ can be smaller or larger than $f_{in}$. In the former case, the buffer memory 100 will gradually be filled with information, resulting in an overflow. In the latter case, the buffer will gradually be emptied, until no bits are available anymore for supply with the required rate of $f_{out}$. In order to overcome these problems, the buffer memory 100 is provided with an output 102 at which a signal is available which is indicative of the filling degree of the buffer memory 100. This signal is converted into a control signal in a converter 104, and supplied to a motor control unit 106. The motor control unit 106 supplies drive signals to the inputs 62a,62b and 64a,64b of the motors 40 and 42' respectively.

When $f_{out}$ is larger than $f_{in}$, the filling degree decreases. As a result, a control signal is generated such that the transport speed of the record carrier 4 is increased. When $f_{out}$ is smaller than $f_{in}$, the filling degree increases. As a result, a control signal is generated such that the transport speed of the record carrier 4 is decreased. The coarse control loop, via the elements 60, 82 and 34 as well as the fine control loop 30, via the elements 70, 72, 82 and 34' adapts itself automatically to the varying transport speed of the record carrier, as explained above.

Figure 3:
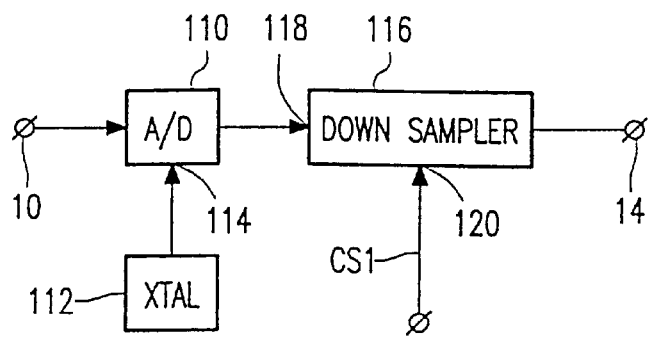
FIG. 3 shows another embodiment of the A/D converter in the apparatus of FIG. 1.

FIG. 3 shows another embodiment of the A/D converter unit 12 of FIG. 1. The A/D converter unit of FIG. 3 comprises an A/D converter 110, which receives a sampling frequency generated by an oscillator 112 via a clock input 114. The sampling frequency generated by the oscillator 112 can be higher than $f_s$. The samples generated by the converter 110 are supplied to a down-sampler, which down samples the signal supplied to its input 118 in response to the first control signal cs1, applied to a control signal input 120. At its output 14, the information signal, sampled at the frequency $f_s$, will be available.

It should be noted that the down-sampler 116 can not only down sample the array of samples applied to its input 118, but can also, if required, carry out an interpolation, so as to obtain its output signal.

While the invention has been described with reference to preferred embodiments thereof, it is to be understood that these are not limitative examples. Thus, various modifications may become apparent to those skilled in the art, without departing from the scope of the invention, as defined by the claims. As an example, the control signal cs2 need not be derived from tacho impulses supplied by a tacho generator coupled to the friction roller 48. The second control signal could be derived in a different way, such as from signals (such as e.g., a control pulse signal) recorded in a track running on (e.g., longitudinally along) the record carrier 4. Further, in an alternative embodiment, the third control signal cs3 could be generated in a way different from the way described above, namely, from the output 102 of the buffer memory 100. In this alternative embodiment, $f_{out}$ is, e.g., derived from the element 82, see FIG. 1, and equals $f_s/N$. The control signal present at the output 102 of the buffer memory 100 is now a measure of the integral of $f_b-f_s/N$, and therefore a measure of the integral of the control signal $CS_3$. Further, the record carrier may be a longitudinal record carrier, or a disk type record carrier, of the magnetic or the optical type.

Further, the invention lies in each and every novel feature or combination of features.

What is claimed is:

1. An apparatus for reproducing an information signal from a record carrier, comprising:

reading means for reading the information signal from a track on the record carrier, the reading means comprising at least one read head for reading the information signal from said track;

A/D conversion means for A/D converting the information signal read from the record carrier with a specific clock frequency, in response to a first control signal;

bit detector means having an input coupled to the A/D conversion means, said bit detector means retrieving a sequence of bits from the signal applied to its input, with a specific bit frequency, output means for supplying the sequence of bits;

means for deriving said first control signal; and means for deriving said specific bit frequency, wherein the means for deriving said first control signal comprises:

means for deriving a second control signal which is a measure of the relative velocity of the at least one read head with reference to the said track;

means for deriving a third control signal which has a relationship with the bit frequency; and means for deriving the first control signal from the second and third control signals.

2. The apparatus as claimed in claim 1, wherein the apparatus further comprises voltage-controlled oscillator means for generating said specific clock frequency in response to said first control signal.

3. The apparatus as claimed in claim 1, wherein the apparatus further comprises digital equalizer filter means for equalizing the digitized information signal read from the A/D conversion means to form an equalized information signal, with said specific clock frequency.

4. The apparatus as claimed in claim 3, wherein the means for deriving said specific bit frequency is in digital form and derives said specific bit frequency from said equalized information signal.

5. An apparatus for reproducing an information signal from a record carrier, comprising:

reading means for reading the information signal from a track on the record carrier, the reading means comprising at least one read head for reading the information signal from said track;

A/D conversion means for A/D converting the information signal read from the record carrier with a specific clock frequency, in response to a first control signal;

bit detector means having an input coupled to the A/D conversion means, said bit detector means retrieving a sequence of bits from the signal applied to its input, with a specific bit frequency;

output means for supplying the sequence of bits;

means for deriving said first control signal; and means for deriving said specific bit frequency and for deriving a second control signal, wherein the means for deriving said first control signal generates the first control signal in response to the second control signal such that the specific clock frequency and the bit frequency are in a substantially fixed ratio N to each other, irrespective of the relative velocity of said at least one read head with reference to the track, where N is a positive constant value.

6. An apparatus for reproducing an information signal from a record carrier, comprising:

reading means for reading the information signal from a track on the record carrier, the reading means comprising at least one read head for reading the information signal from said track;

A/D conversion means for A/D converting the information signal read from the record carrier with a specific clock frequency, in response to a first control signal;

bit detector means having an input coupled to the A/D conversion means, said bit detector means retrieving a sequence of bits from the signal applied to its input, with a specific bit frequency;

output means for supplying the sequence of bits;

means for deriving said first control signal; and means for deriving said specific bit frequency, wherein the means for deriving said first control signal comprises:

coarse control signal generator means for deriving a coarse control signal so as to generate said specific clock frequency such that roughly N samples per bit are supplied by the A/D conversion means, irrespective of the relative velocity of said at least one read head with reference to the track; and fine control signal generator means for deriving a fine control signal so as to correct for the deviation of the specific clock frequency, expressed in number of samples per bit, from the value of N samples per bit, where N is a positive constant value.

* * * * *

UNITED STATES PATENT AND TRADEMARK OFFICE
CERTIFICATE OF CORRECTION

| | |
|---|---|
| PATENT NO. | : 6,108,154 |
| DATED | : August 22, 2000 |
| INVENTOR(S) | : Gijsbert J. Van Den Enden |

It is certified that error appears in the above-identified patent and that said Letters Patent is hereby corrected as shown below:

<u>Title page,</u>
Item [57], ABSTRACT,
Line 17, delete "said".
Line 18, delete "said".

Signed and Sealed this

Twelfth Day of November, 2002

*Attest:*

*Attesting Officer*

JAMES E. ROGAN
*Director of the United States Patent and Trademark Office*